United States Patent [19]

Urban

[11] Patent Number: 4,683,568

[45] Date of Patent: Jul. 28, 1987

[54] METHOD OF MONITORING COMPUTER ELEMENTS, PARTICULARLY MICROPROCESSORS

[75] Inventor: Manfred Urban, Auenwald, Fed. Rep. of Germany

[73] Assignee: Robert Bosch GmbH, Stuttgart, Fed. Rep. of Germany

[21] Appl. No.: 760,734

[22] PCT Filed: Nov. 2, 1984

[86] PCT No.: PCT/DE84/00232

§ 371 Date: Jul. 11, 1985

§ 102(e) Date: Jul. 11, 1985

[87] PCT Pub. No.: WO85/02475

PCT Pub. Date: Jun. 6, 1985

[30] Foreign Application Priority Data

Nov. 30, 1983 [DE] Fed. Rep. of Germany ....... 3343227

[51] Int. Cl.[4] .............................................. G06F 11/00
[52] U.S. Cl. ....................................... 371/12; 371/66; 371/62
[58] Field of Search .................. 371/12, 66, 19, 62, 371/25, 16, 48; 364/200, 900, 580, 119

[56] References Cited

U.S. PATENT DOCUMENTS

| 4,263,647 | 4/1981 | Merrell | 371/48 |
| 4,287,565 | 9/1981 | Haubner et al. | |
| 4,410,938 | 10/1983 | Higashiyama | 371/19 |
| 4,586,179 | 4/1986 | Sizazi | 371/12 |
| 4,594,685 | 6/1986 | Owens | 371/16 |

FOREIGN PATENT DOCUMENTS 0027432 of 0000 European Pat. Off. .
3240704 of 0000 Fed. Rep. of Germany .
7900621 of 0000 France .

Primary Examiner—Michael R. Fleming
Attorney, Agent, or Firm—Frishauf, Holtz, Goodman & Woodward

[57] ABSTRACT

A method is proposed which serves to enable recognition, in microprocessors (1) provided with a monitoring device (2) having a signal generator stage for reset signals, of whether a reset signal was effected by the monitoring device (2) or by a power-on reset circuit (5). To this end, a comparison is performed between a comparison pattern stored in a non-erasable memory zone (6) and a pattern, which is typical of resetting erected by the monitoring device (2), located in an erasable memory zone (7).

4 Claims, 2 Drawing Figures

METHOD OF MONITORING COMPUTER ELEMENTS, PARTICULARLY MICROPROCESSORS

STATE OF THE TECHNOLOGY

The invention relates generally to a method for monitoring computer elements, particularly microprocessors, and more particularly to improving processor efficiency by distinguishing between interrupts and power failures using a single input pin of the chip.

BACKGROUND:

From German Patent Disclosure Documents DE-OS No. 28 42 892 and DE-OS No. 29 03 638, monitoring devices for program controlled equipment are known which recognize short duration disturbances or system breakdowns and thereupon actuate a reset or interrupt input of a microprocessor. This stops the then-running program, which by resetting is put back into proper operation at the beginning of the program, so that an emergency circuit arrangement can be actuated. In such an arrangement, it is a problem that it is impossible to distinguish whether a reset has been brought about by the monitoring device (so-called "watchdog reset") or by other causes, for instance by switching on the supply voltage (so-called "power-on-reset").

In order to attain a definite status after switching on the supply voltage, from which status a normal program course can be started, the emergency circuit arrangement must first be connected to the microprocessor after a stable microprocessor state has been attained. Because of circuitry or program controlled provisions, it is necessary for the connection of the monitoring device to take place in such a way that a reset signal of the monitoring device will not immediately stop the microprocessor and start it up again.

From German Patent Disclosure Document DE-OS No. 32 40 704, a circuit arrangement for monitoring computer elements is know which, for longer-lasting disturbances, keeps attempting to restart the program of the element by means of reset signals. Here also, the problem exists that it is impossible to distinguish between a reset caused by switching on the power, or by the actuation of a reset key, and a reset brought about by a monitoring device.

THE INVENTION

The method according to the invention for monitoring computer elements, particularly microprocessors, has the advantage over the prior art that by means of a simple program controlled decision at the beginning of the portion of the program that follows resetting, it is possible to recognize whether the reset was triggered unconditionally, or by the activity of a monitoring device. Since this decision is made under program control by the microprocessor, it is readily possible to implement changes or make further decisions in the decision-making process. This has the advantage of shortening the restarting of the program considerably, because a complete reinitializing of the registers and reloading of the user program are no longer necessary. It is also advantageous that a decision according to the method of the invention can be made without requiring any special technical circuitry.

DRAWING

An exemplary embodiment is shown in the drawing and explained in further detail in the ensuing description.

DESCRIPTION OF THE EXEMPLARY EMBODIMENT

Figure 1:
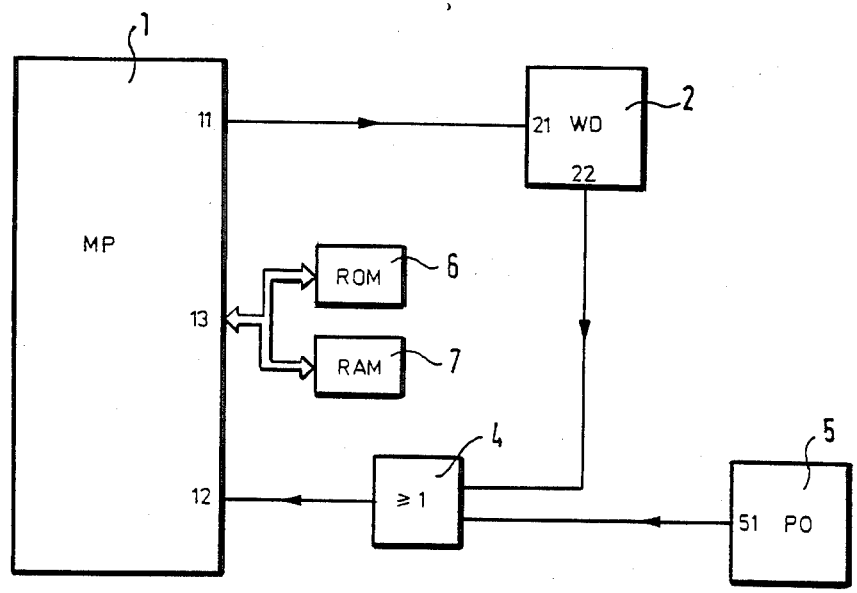
FIG. 1 is a circuit diagram of an apparatus for performing the method.

FIG. 1 shows a microprocessor (MP) 1, a monitoring device (watchdog) 2, a power-on reset circuit (PO) 5, a fixed value memory (ROM) 6 and an erasable memory (RAM) 7.

The microprocessor 1 is connected via a bus at one output 13 to the fixed value memory 6 and the erasable memory 7. One output 11 of the microprocessor 1 is connected to one input 21 of the watchdog 2, the output 22 of which is connected to one input of an OR element 4. A further input of the OR element 4 is connected to one output 51 of the power-on reset circuit 5, and the output of the OR element leads to one input 12 of the microprocessor 1.

Via the output 11, the microprocessor 1 furnishes statistically distributed signals in a definite frequency range to the watchdog 2 in a known manner. If the signal is outside this frequency range or data rate, for instance when operation is stopped, then an endless loop or indefinite program course of the microprocessor 1 is involved, which is recognized by the watchdog 2, which thereupon triggers a conditional reset via the OR element 4. When the supply voltage is switched on, an unconditional reset is triggered by the power-on reset circuit 5 via the OR element 4.

Figure 2:
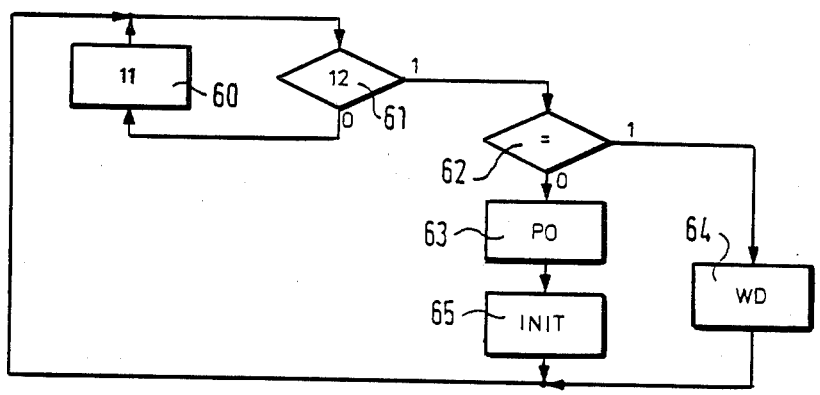
FIG. 2 is a signal diagram explaining its operation.

As shown in FIG. 2, in its normal state the microprocessor 1 is in a loop between a main program 60, in which at least one pulse is formed at the output 11, and a reset interrogation 61 by an interrogation of the input 12. It does not matter whether this interrogation, in the type of microprocessor selected for a specific application, is realized by means of a program or by means of circuitry. Thus if no reset ("0") is present, then operation continues in the main program 60.

When a reset ("1") is present, a (bit) pattern comparison makes it possible to recognize whether a reset is effected by the watchdog 2 or by the power-on reset circuit 5. In the case of a power-on reset, an indefinite pattern is present in the erasable memory of the microprocessor 1. In the case of a watchdog reset, a pattern that is typical of the previous history of a watchdog reset, which is known a priori, is present in at least a small portion of the erasable memory. For the comparison 62, a comparison pattern corresponding to this typical pattern is loaded from the fixed value memory 6 and compared with the pattern in the particular erasable memory involved. If there is equality, or typical partial equality, of these patterns ("1"), a transfer is made to a program section 64, which performs a task associated with the watchdog reset and reactivates the watchdog 2 via the output 11 of the microprocessor 1. Upon non-equality of the patterns ("0"), a transfer is made to a program section 63, which has to do with the power-on reset and brings about a reinitialization 65 of the entire system. After programs 63, 65 or 64 have been completed, the apparatus of FIG. 1 is once again in the program status 60, 61 shown in FIG: 2.

I claim:

1. Method for monitoring computer elements (1), particularly microprocessors, having
   a reset input (12),
   a volatile or eraseable memory (7),
   a non-volatile or non-eraseable memory (6),
   input/output port means (13) connecting said memories to the computer element (1),
   a monitoring device (2) for the computer element (1) which device causes a resetting of the computer element (1),
   comprising the steps of
   detecting a reset signal on said reset input (12),
   performing a comparison (62) between a comparison pattern stored in said non-eraseable memory (6) and a pattern present in said eraseable memory (7); and
   performing, selectively, one of a complete re-initialization (65) of said microprocessor and a shorter program sequence (64) in dependence upon whether said comparison indicates that the pattern in said volatile or eraseable memory is random.

2. Method according to claim 1, characterized in that if there is at least partial equality between the pattern and the comparison pattern, a program (64) is carried out which executes a function associated with a reset caused by the monitoriing device (2).

3. Method according to claim 2, characterized in that the function includes an activation of the monitoring device (2).

4. Computer apparatus, for performing a method according to any one of the foregoing claims, having
   said reset input (12),
   said monitoring device (2) for the computer element (1) which device causes a resetting of the computer element (1),
   said volatile or eraseable memory (7),
   said non-volatile or non-eraseable memory (6),
   said input/output port means (13) connecting said memories to the computer element (1),
   a power-on circuit (5), and
   a logical linking device (4),
   wherein both the monitoring device (2) and the power-on reset circuit (5) are connected to inputs of said logical linking element (4), and the output of the logical linking element (4) is connected to said reset input (12) of the computer element (1).

* * * * *